(12) United States Patent
    Freeman

(10) Patent No.: US 8,380,210 B2
(45) Date of Patent: Feb. 19, 2013

(54) METHOD AND SYSTEM OF PROVIDING ON-NETWORK COMMUNICATION SERVICES

(75) Inventor: Michael Freeman, Colorado Springs, CO (US)

(73) Assignee: Verizon New Jersey Inc., Newark, NJ (US)

( * ) Notice: Subject to any disclaimer, the term of this patent is extended or adjusted under 35 U.S.C. 154(b) by 1307 days.

(21) Appl. No.: 11/617,453

(22) Filed: Dec. 28, 2006

(65) Prior Publication Data

US 2008/0159516 A1     Jul. 3, 2008

(51) Int. Cl.
    *H04W 40/00*     (2009.01)
(52) U.S. Cl. ... 455/445; 455/401; 455/428; 379/221.01; 379/221.14; 379/355

(58) Field of Classification Search ............. 455/445, 455/401, 428; 379/221.01, 221.14, 355
    See application file for complete search history.

(56) References Cited

U.S. PATENT DOCUMENTS

| 7,398,087 B1* | 7/2008 | McConnell et al. ........ 455/435.1 |
| 2002/0122547 A1* | 9/2002 | Hinchey et al. ........... 379/221.01 |
| 2003/0231759 A1* | 12/2003 | Bedingfield et al. ...... 379/355.01 |
| 2004/0081173 A1* | 4/2004 | Feather .................... 370/395.54 |
| 2005/0105497 A1* | 5/2005 | Belkin et al. .................. 370/338 |
| 2006/0052133 A1* | 3/2006 | Mallya ........................ 455/556.1 |

* cited by examiner

*Primary Examiner* — Kwasi Karikari

(57) ABSTRACT

An approach is provided for using on-network communication services for wireless calls. Dialed digits associated with a call originated from a wireless network are received. It is then determined whether the dialed digits include either a steering digit or a pre-determined prefix. The call is routed according to an abbreviated dialing plan if the steering digit or the pre-determined prefix is present.

24 Claims, 6 Drawing Sheets

000
METHOD AND SYSTEM OF PROVIDING ON-NETWORK COMMUNICATION SERVICES

BACKGROUND INFORMATION

Modern telecommunications have afforded organizations, large and small, with many advanced features to enhance productivity. Wireline and wireless communication technologies have progressed largely in independent fashion because of their respective engineering obstacles and differing levels of technological maturity. For instance, wireless network designers are concerned with bandwidth and power constraint issues, while wireline communication systems are not so limited. Nonetheless, it is recognized that these systems need to interface and interoperate efficiently to permit users to seamlessly communicate, using voice services, across wireless and wireline systems. Integration of these different technologies poses a significant challenge, particularly with respect to how different dialing plans can co-exist. For instance, private voice networks have developed for wireline systems, whereby users are permitted to utilize a dialing plan that differs from the public dialing plans, mainly to provide efficient operation of the organization. No such capability, however, exists within the wireless domain. Consequently, the user must utilize multiple dialing plans, depending on the technology.

Therefore, there is a need for providing an approach that permits a user to use a common dialing plan that can accommodate both wireline and wireless communication systems.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DETAILED DESCRIPTION

An apparatus, method, and software for providing on-network communication services are described. In the following description, for the purpose of explanation, numerous specific details are set forth in order to provide a thorough understanding of the various exemplary embodiments. It is apparent, however, to one skilled in the art that the various exemplary embodiments may be practiced without these specific details or with an equivalent arrangement. In other instances, well-known structures and devices are shown in block diagram form in order to avoid unnecessarily obscuring the exemplary embodiments.

Although various exemplary embodiments are described with respect to a private network that provides voice services to an enterprise, it is recognized that these embodiments can be applied to other technologies and organizational structures.

Figure 1:
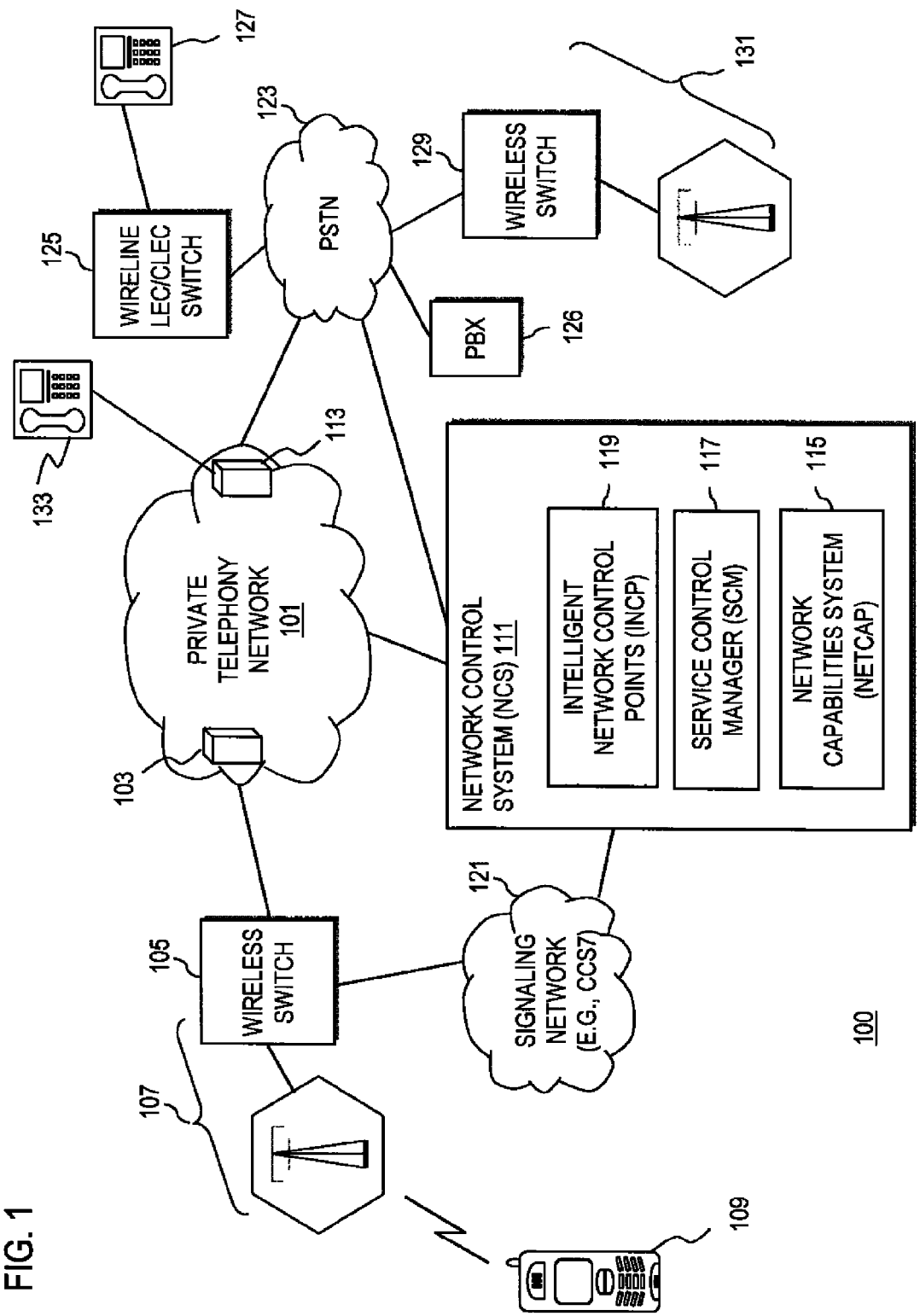
FIG. 1 is a diagram of a communication system capable of providing abbreviated dialing over a wireless network, according to an exemplary embodiment.

FIG. 1 is a diagram of a communication system capable of providing abbreviated dialing over a wireless network, according to an exemplary embodiment. A communication system 100 supports an enterprise voice service, whereby the enterprise possesses a private, virtual or dedicated telephony network 101. This service can be provided through a private branch exchange (PBX) system or allocated resources within a service provider network (e.g., CENTREX service). Calls originating within the private network and terminating in the private network 101 can be made more efficient through use of an abbreviated dialing plan. Additionally, private networks provide users with greater features and services that are tailored to the organization's needs. On-network ("on-net") refers to communication activities (e.g., call terminations) within the private network 101, while off-network ("off-net") refers to activities outside of the private network 101.

A private telephony network 101 utilizes an abbreviated dialing plan for a multi-site enterprise using dedicated trunks to link to the network 101. In this example, the private telephony network 101 includes a switch 103 that communicates with a wireless switch 105 of a wireless network 107. The wireless network 107 can employ various technologies, including spread-spectrum (e.g., Code Division Multiple Access (CDMA), Evolution Data Optimized (EVDO), etc.), Global System for Mobile Communications (GSM), Orthogonal Frequency Division Multiplexing (OFDM)/Orthogonal Frequency Division Multiple Access (OFDMA), High-Speed Downlink Packet Access (HSDPA)/High Speed Uplink Packet Access (HSUPA), Personal Communication System (PCS), etc. The network 101, in an exemplary embodiment, is fully redundant to protect against network outages or congestion through the use of multiple alternate routes. Assuming a mobile terminal 109 is part of the enterprise, the system 100 can seamlessly integrate with the wireline enterprise dialing plan through the services of a Network Control System (NCS) 111. Accordingly, the mobile terminal 109 is able to place and receive enterprise telephone calls using abbreviated dialing, as well as the dialing plan supported by the wireless network 107. It is contemplated that the abbreviated dialing plan can be seamlessly implemented over IP (Internet Protocol) Multimedia Systems (IMS)—e.g., Wi-Fi (Wireless Fidelity) and Wi-Max (Worldwide Interoperability for Microwave Access) infrastructure.

In an exemplary embodiment, the Network Control System 111 serves as the centralized network intelligence, providing product features and network routing information for private telephony services. This intelligence is centralized, in part, to gain network routing efficiencies, to perform immediate customer service changes, and to off-load processing from network switches 103, 113 so that these switches 103, 113 can be fully dedicated to call switching functions. As shown, the NCS 111 includes the following components: a Network Capabilities System (NETCAP) 115, a Service Control Manager (SCM) 117, and Intelligent Network Control Points (INCP) 119. The NETCAP 115 is a database system that defines the enterprise's network features. Information entered into NETCAP 115 includes, for example, call routing, feature changes and updates, monitoring and reporting functions, and customer-based data management. Once orders are entered into NETCAP 115, they are sent to the Service Control Manager 117.

The Service Control Manager 117 provides a continuous stream of database changes, including scheduled and recurring changes to the network 101. As alluded to, these changes are sent from the NETCAP 115. According to one embodiment, the SCM 117 can include a scalable number of processors with fully redundant high-speed data storage systems. After receiving configuration information updates from the NETCAP 115, the SCM 117 transmits the updates to the Intelligent Network Control Points (INCP) 119 through, for instance, redundant data links. The SCM 117 also ensures that information in each INCP 119 is current and identical among all INCPs 119.

The INCP 119 stores the call processing information used by the network switches 103, 113 to process and route voice calls. For every call, the network switches 103, 113 communicate with the INCP 119. The INCP 119 receives feature database information including routing, termination, and special handling instructions. Changes sent by the SCM 117 to the INCPs 119 (which may be geographically dispersed) can take effect immediately. In one embodiment, the INCPs 119 can employ identical hardware and software configurations. To ensure that at least one INCP 119 is available for call-processing functions, each switch 103, 113 in the network 101 is connected to the INCPs 119 via multiple links (e.g., two to each INCP 119). Each switch 103, 113 can be redundantly connected to two different INCPs 119, according to an exemplary embodiment.

As seen, the system 100 deploys a signaling network 121, such as Common Channel Signaling 7 (CCS7). CCS7 separates signaling information relating to a call from the call path itself, sending the signaling information along a separate data path throughout the system 100. CCS7 provides fast call setup time, while improving the ability to spot and correct transmission problems. The CCS7 network 121 includes Signal Transfer Points (STPs) (not shown) deployed in redundant pairs called "mated pairs." The STP serves as a CCS7 network routing hub and manages the CCS7 network 121 by exchanging three types of messages. These types of messages include the following: Integrated Services User Part (ISUP), Signaling Connection Control Parts/Transactional Capabilities Application Part (SCCP/TCAP), and Signaling Network Management messages. The Integrated Services User Part (ISUP) messages relate to call control, and are passed between nodes to perform trunk setup. The SCCP/TCAP messages can be used in such database queries as a toll free transaction-based service or Line Information Database (LIDB) service. The Signaling Network Management messages provide node status information for network administration and maintenance.

As shown, the private telephony network 101 has connectivity to a public switched telephone network (PSTN) 123. The PSTN 123 is linked to a wireline switch 125, which may be part of a local area exchange (LEC) or a competitive LEC (CLEC). In additional, the PSTN 123 can provide a dedicated trunk to a private branch exchange (PBX) 126; with the PBX 126, the dial plan is identified by a trunk group ID (identifier). The switch 125 serves telephone stations 127, of which one is shown. The PSTN 123 can also interface with a wireless switch 129 of a wireless network 131. This network can be maintained by a service provider that is different from that of the wireless network 107.

The abbreviated dialing plan involving a wireless call placed by the mobile terminal 109 to a telephone station 133 within the private telephony network 101 is next explained.

Figure 2:
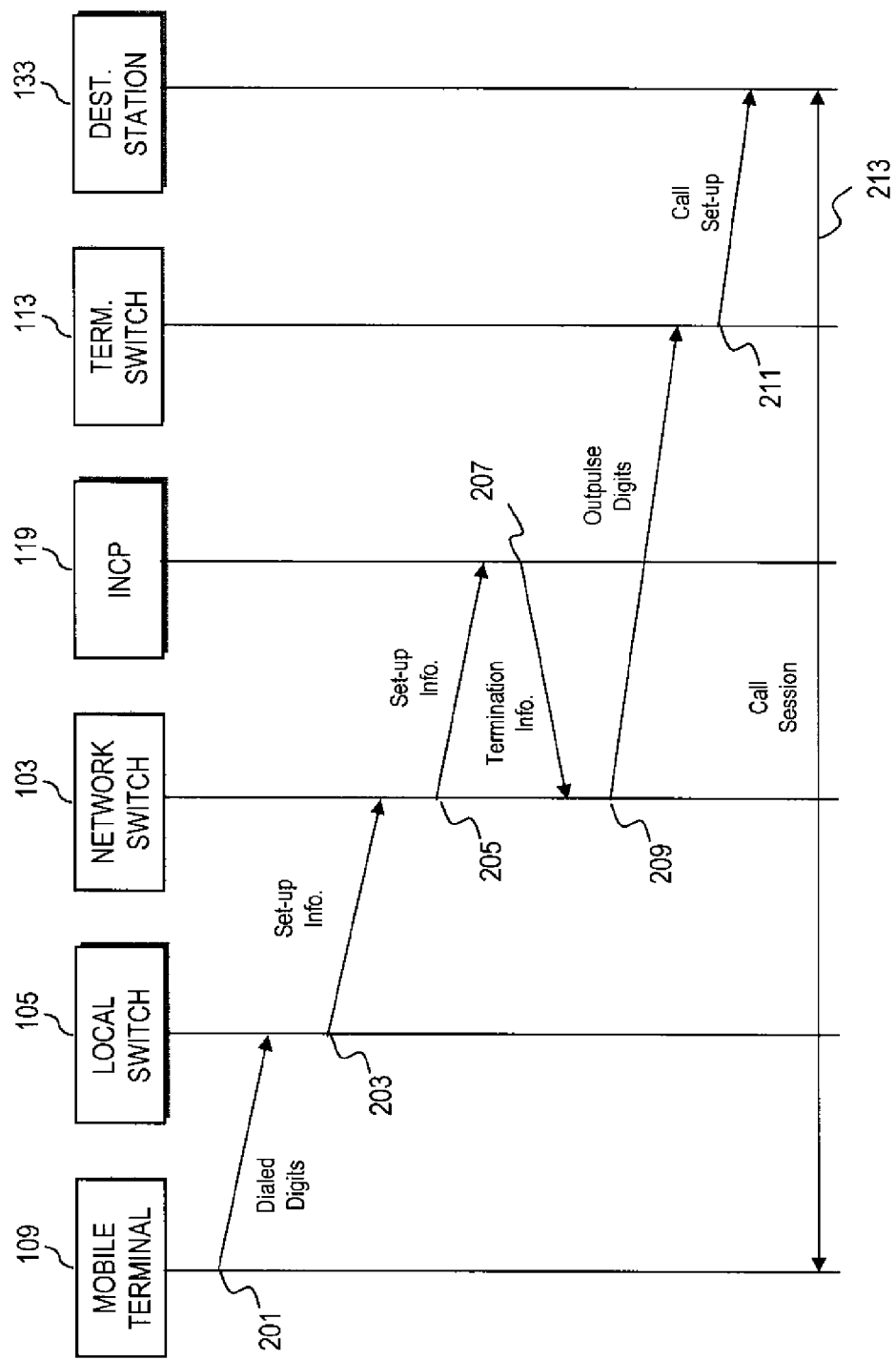
FIG. 2 is a call flow involving on-network and off-network call origination, according to an exemplary embodiment.

FIG. 2 is a call flow involving on-network and off-network call origination, according to an exemplary embodiment. A wireless user (e.g., subscriber) can dial a steering digit, such as the star key (*), when initiating an on-network call. For instance, a caller using the mobile terminal 109 originates an on-network call by dialing an abbreviated number "*987-6543" from an on-network provisioned line. In step 201, the dialed digits are forwarded to the local switch 109, which in this case is the wireless switch 105. The local switch 105, honoring the steering digit "*," forwards the call setup information (Caller ID and Called number) to the network switch 103, using a dedicated trunk group (step 203).

The network switch 103 forwards the call setup information, as in step 205, to the INCP 119. The INCP 119 looks up the originating number (Caller ID) and dialed number and determines the destination switch, trunk group, and outpulse digits. This termination information is sent to the network switch 103, as in step 207. In step 209, the call is routed to the network terminating switch 113. The switch 113 then forwards the call set-up request to the destination station 133 (step 211). In step 213, a call session is established between the mobile terminal 109 and the destination station 133.

The above process involves placing a call from a private network provisioned line. The process is also applicable to calls originating off-network (i.e., from a non-private network provisioned line). Instead of the start ("*") steering digit, a pre-determined prefix, such as "1-700" can be utilized. For instance, the wireless caller originates a call by dialing 1-700 987-6543 from the non-private network provisioned line. Although one access approach is illustrated, the caller can gain access to the network 103 via the wireless network 107, a wired local network, a dedicated fiber network, a LEC-provided leased line, or by using one of the gateway switched access services (such as equal access or 1-700 access). The 1-700 prefix instructs the local switch. 105 to forward the call setup information to the network switch 103. The prefix also indicates to the service provider associated with the private telephony network 101 that this is a private network dialed number. The call setup information is forwarded to the INCP 119 and the call is completed as described above.

It is noted that the call set-up utilizing the abbreviated dialing plan can be initiated by a wireline station, e.g., station 133 to a wireless station (e.g., mobile terminal 109).

Figure 3:
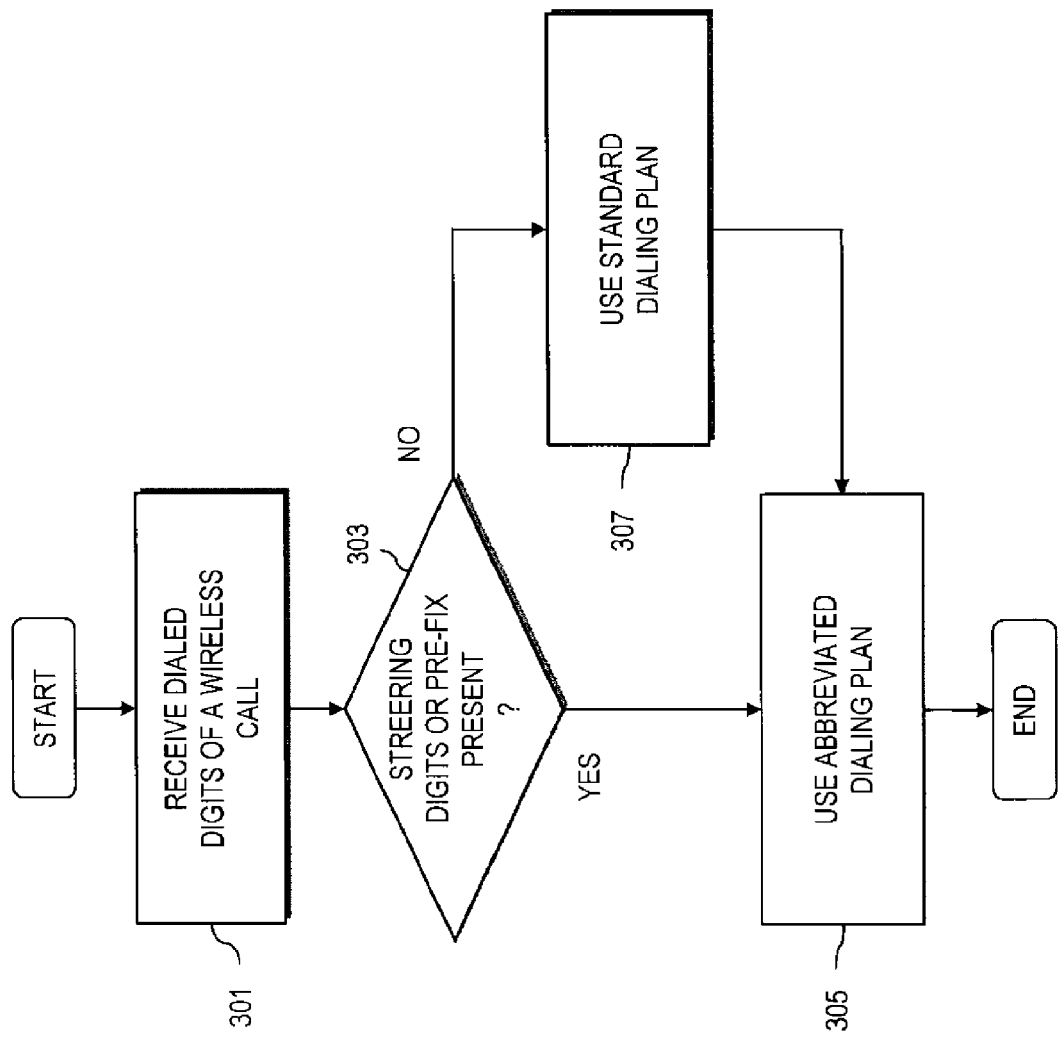
FIG. 3 is a flowchart of a process for providing abbreviated dialing for wireless calls, according to an exemplary embodiment.

FIG. 3 is a flowchart of a process for providing abbreviated dialing for wireless calls, according to an exemplary embodiment. As described in the call flow of FIG. 2, wireless callers can employ a steering digit to trigger an abbreviated dialing plan. Thus from the perspective of the private telephony network 101, a call is received from the wireless caller, in which the dialed digits are examined for presence of a steering digit(s) or a pre-determined prefix, per steps 301 and 303. If either a steering digit or prefix is detected, an abbreviated dialing plan is employed to map the dialed digits to the full number for routing (step 305). Otherwise, a standard or default dialing plan can be used, as in step 307.

On-net enterprise wireless users can dial "*" and use the abbreviated numbers. Off-net enterprise users can also dial destinations numbers within the private telephony network 101 by prefixing 1-700 to the abbreviated number, and receive calls from their colleagues who have dialed the proper abbreviated destination. Exemplary dial plan mappings are shown in Table 1 for on-net call origination, and Table 2 for off-net call origination.

TABLE 1

On-Net Call Origination

| Dial | *-456.7890 (On-net call) | to reach | 1- 123.456.7890 | Off-net termination |
|---|---|---|---|---|
| | *-345.6789 | | 345.6789 | On-net to On-net |

TABLE 2

Off-Net Call Origination

| Dial | 1-700.456.7890 | to reach | 456.7890 | Dial 1 on-net switched access by caller ID, to On-net destination |
|---|---|---|---|---|
| | 1.800.USE.VNET, 456-7890, authorization code Note: Authentication by employee number or ID | | 456.7890 | On-net call |
| | Calling card (toll free number, authorization code, 456.7890 | | 456.7890 | On-net Call |

Figure 4:
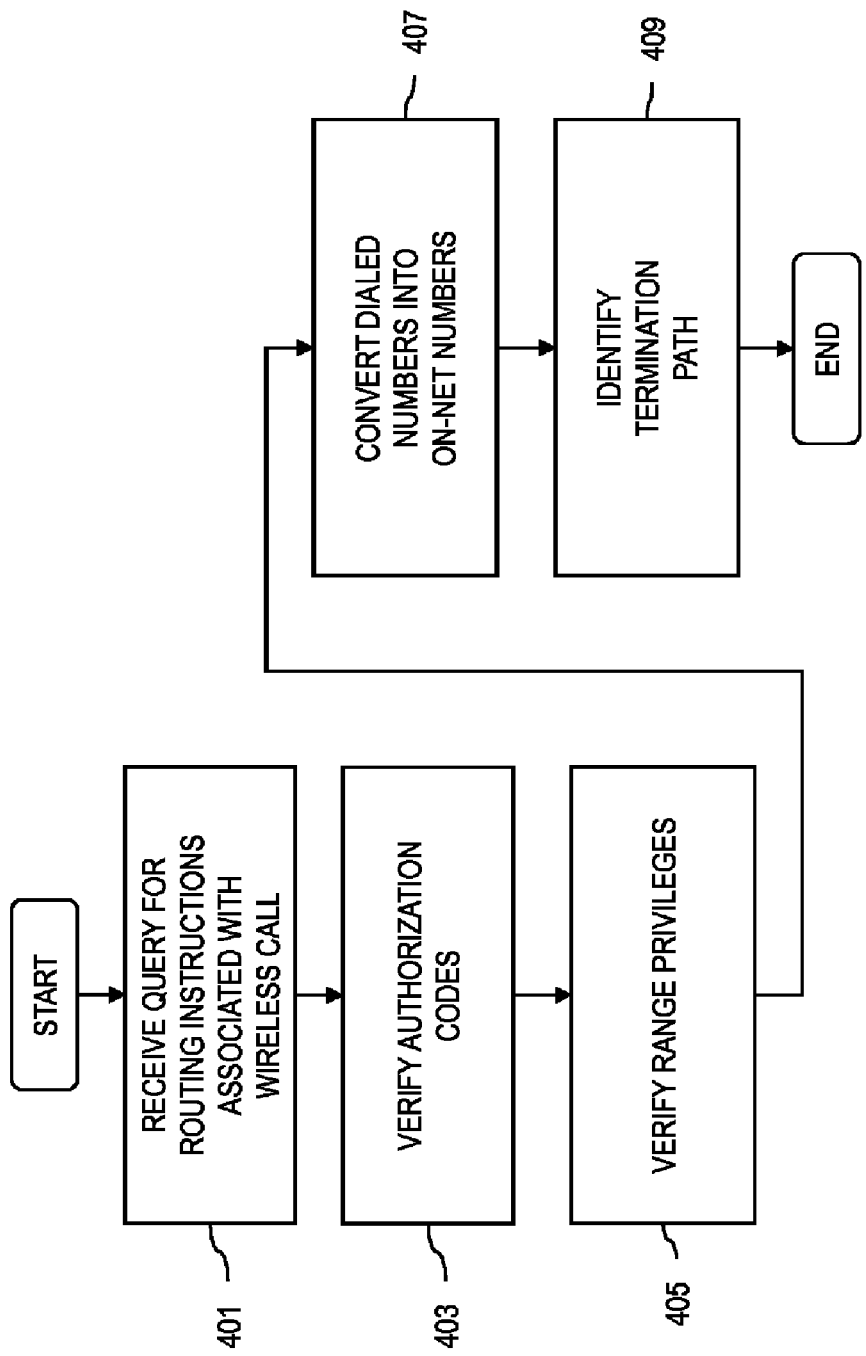
FIG. 4 is a flowchart of a process for routing a wireless call, according to an exemplary embodiment.

The number conversions for routing the call, in an exemplary embodiment, are performed by the Intelligent Network Control Points (INCP) 119, as described with respect to FIG. 4.

FIG. 4 is a flowchart of a process for routing a wireless call, according to an exemplary embodiment. A call destined for a caller within the private telephony network 101 is processed by a primary routing switch (e.g., switch 103). This primary routing switch queries the INCP 119 for routing instructions, per step 401. The INCP 119 translates the number dialed, to a domestic number, international number or private dialing plan. The INCP 119 performs the following tasks before the call is completed: verify authorization codes (step 403); verify range privileges (step 405); and convert DDD/IDDD (Direct Distance Dialing/International Direct Distance Dialing) numbers into on-net numbers (step 407). In step 409, the INCP 119 identifies the appropriate termination path and provides this information in a response to the query from the network 103.

With the termination information, the routing switch 103 can terminate the call. Depending on whether the destination station is on-net or off-net, the switch 103 can switch the call to a wireless trunk, a switched trunk, and an IP trunk, or the PSTN 123. If the call is being handed off to the PSTN 123 for termination to a competitive network (e.g., CLEC switch 125), the routing switch 103 can determine the optimal route.

It is noted that the abbreviated dialing plan can be utilized in a wireless-to-wireless call as well. Under such a scenario, the mobile terminal 109 can place a call to another mobile terminal (not shown) using abbreviated dialing, assuming the other mobile terminal is a part of the same private network.

In addition to abbreviated dialing, other on-net services can be provided to enhance communications capabilities for enterprise users, thereby increasing productivity of the enterprise.

Figure 5B:
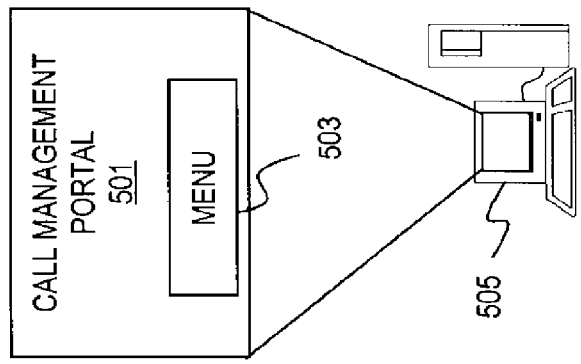
FIGS. 5A and 5B are diagrams of a portal for providing call management functions and features, according to an exemplary embodiment.
Figure 5A:
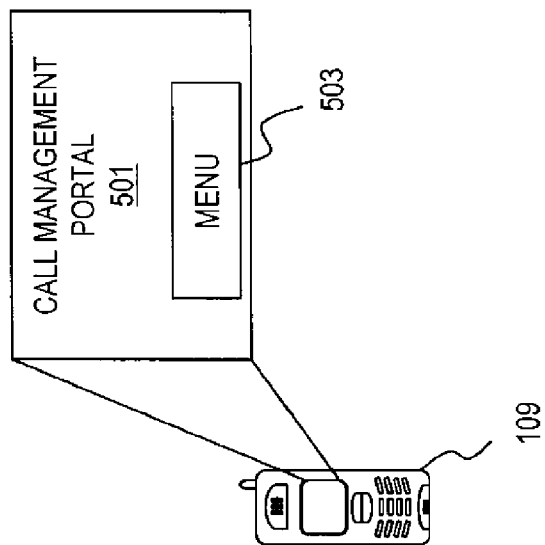

FIGS. 5A and 5B are diagrams of a portal for providing call management functions and features, according to an exemplary embodiment. As described, the enterprise user (or customer) can utilize a single dialing plan, irrespective of whether they initiate or terminate calls from a wireless or wireline station. It is recognized that other on-net services can be developed to assist the enterprise customer in controlling communication costs and promote organizational efficiencies, without requiring users to monitor or adjust their individual communication styles. Therefore, a portal 501 is provided to offer enterprise users a menu 503 that presents subscribers' communication options for tailoring their communication services and features. Each subscriber is assigned an enterprise on-net phone number. The portal 501 permits users to specify dynamic routing changes, static time-of-day routing or selective routing; this capability maximizes call completion.

The portal 501 permits users (or subscribers) to manage their call routing. Wireless subscribers can have the portal available on their mobile phone, as shown in FIG. 5. Wireline subscribers can access the portal from a personal computer (PC) via a graphical user interface (GUI), such as a browser or other web-based applications. By way of example, a telephone user interface and interactive voice response application is made available for all subscribers to enable advanced and alternative features, such as Find-Me, Follow-Me call routing. The parameters associated with the Find-Me, Follow-Me service can include the following: time-of-day, ad-hoc, sequential destination ringing, multiple simultaneous call ringing, real-time call routing announcements back to the caller, selective routing based on caller ID (call screening), do not disturb, and directing calls to a voice mail system. According to one embodiment, the call routing features can be made available from an interactive voice response (IVR) system, a mobile web browser, or a PC web browser.

By managing their incoming calls, the users maintain their presence, thereby improving call completion ratios (which results in increased productivity). For example, call delivery on demand, via the portal 501, means fewer missed calls; this minimizes the rounds of telephone tag and provides greater flexibility in communication with other enterprise users. In addition, depending on individual needs/preferences, users have the opportunity to eliminate or consolidate devices and can be provided with broader communications choices. The expanded Find-Me, Follow-Me features enables subscribers to manage their incoming phone call routing.

The above described processes relating to on-network voice services may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 6:
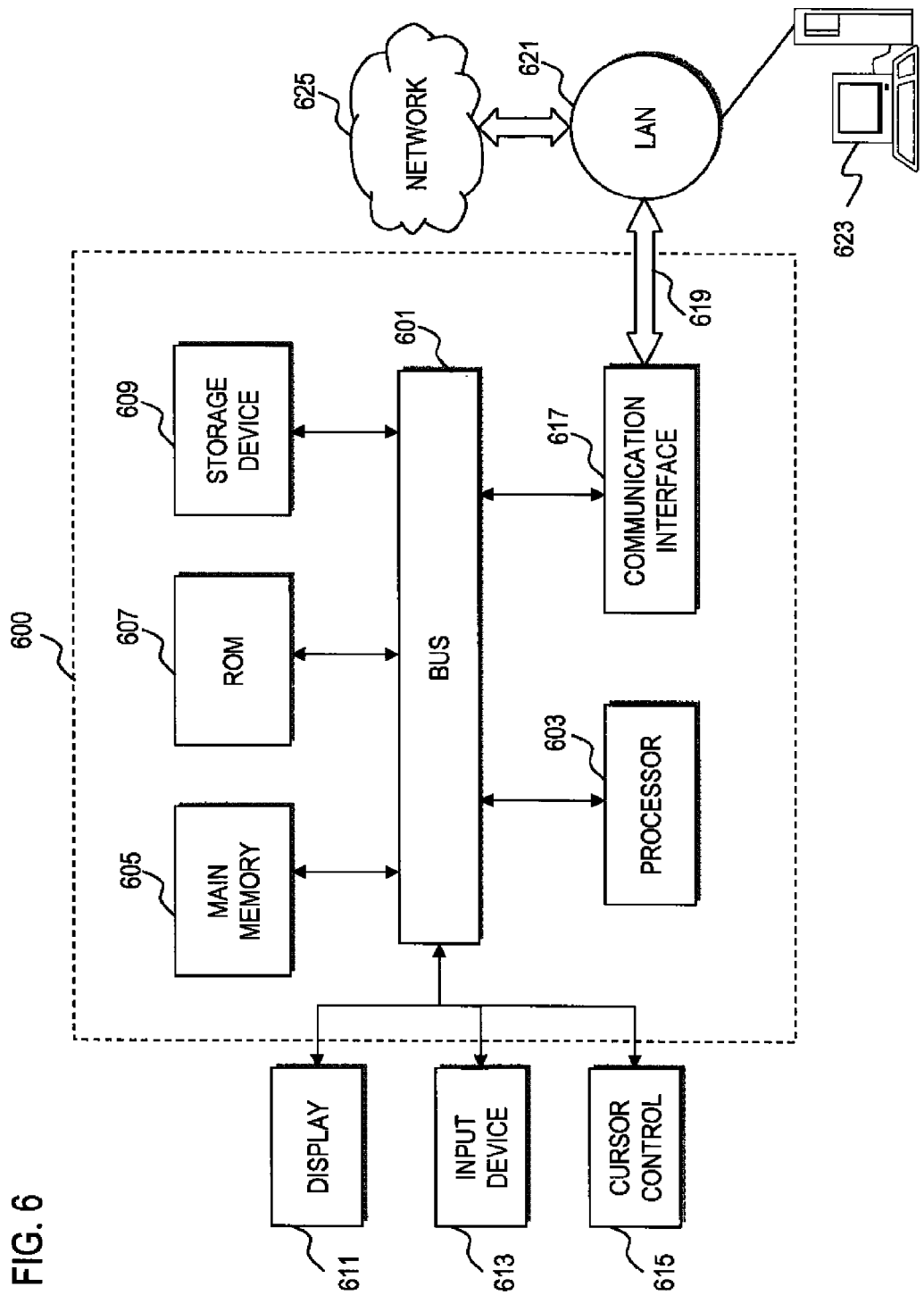
FIG. 6 is a diagram of a computer system that can be used to implement various exemplary embodiments.

FIG. 6 illustrates a computer system 600 upon which an exemplary embodiment can be implemented. For example, the processes described herein can be implemented using the computer system 600. The computer system 600 includes a bus 601 or other communication mechanism for communicating information and a processor 603 coupled to the bus 601 for processing information. The computer system 600 also includes main memory 605, such as a random access memory (RAM) or other dynamic storage device, coupled to the bus 601 for storing information and instructions to be executed by the processor 603. Main memory 605 can also be used for storing temporary variables or other intermediate information during execution of instructions by the processor 603. The computer system 600 may further include a read only memory (ROM) 607 or other static storage device coupled to the bus 601 for storing static information and instructions for the processor 603. A storage device 609, such as a magnetic disk or optical disk, is coupled to the bus 601 for persistently storing information and instructions.

The computer system 600 may be coupled via the bus 601 to a display 611, such as a cathode ray tube (CRT), liquid crystal display, active matrix display, or plasma display, for displaying information to a computer user. An input device 613, such as a keyboard including alphanumeric and other keys, is coupled to the bus 601 for communicating information and command selections to the processor 603. Another type of user input device is a cursor control 615, such as a mouse, a trackball, or cursor direction keys, for communicating direction information and command selections to the processor 603 and for controlling cursor movement on the display 611.

According to one embodiment of the invention, the processes described herein are performed by the computer system 600, in response to the processor 603 executing an arrangement of instructions contained in main memory 605. Such instructions can be read into main memory 605 from another computer-readable medium, such as the storage device 609. Execution of the arrangement of instructions contained in main memory 605 causes the processor 603 to perform the process steps described herein. One or more processors in a multi-processing arrangement may also be employed to execute the instructions contained in main memory 605. In alternative embodiments, hard-wired circuitry may be used in place of or in combination with software instructions to implement the exemplary embodiment. Thus, exemplary embodiments are not limited to any specific combination of hardware circuitry and software.

The computer system 600 also includes a communication interface 617 coupled to bus 601. The communication interface 617 provides a two-way data communication coupling to a network link 619 connected to a local network 621. For example, the communication interface 617 may be a digital subscriber line (DSL) card or modem, an integrated services digital network (ISDN) card, a cable modem, a telephone modem, wireless (Wi-Fi or Wi-MAX) or any other communication interface to provide a data communication connection to a corresponding type of communication line. As another example, communication interface 617 may be a local area network (LAN) card (e.g. for Ethernet™ or an Asynchronous Transfer Model (ATM) network) to provide a data communication connection to a compatible LAN. Wireless links can also be implemented. In any such implementation, communication interface 617 sends and receives electrical, electromagnetic, or optical signals that carry digital data streams representing various types of information. Further, the communication interface 617 can include peripheral interface devices, such as a Universal Serial Bus (USB) interface, a PCMCIA (Personal Computer Memory Card International Association) interface, etc. Although a single communication interface 617 is depicted in FIG. 6, multiple communication interfaces can also be employed.

The network link 619 typically provides data communication through one or more networks to other data devices. For example, the network link 619 may provide a connection through local network 621 to a host computer 623, which has connectivity to a network 625 (e.g. a wide area network (WAN) or the global packet data communication-network now commonly referred to as the "Internet") or to data equipment operated by a service provider. The local network 621 and the network 625 both use electrical, electromagnetic, or optical signals to convey information and instructions. The signals through the various networks and the signals on the network link 619 and through the communication interface 617, which communicate digital data with the computer system 600, are exemplary forms of carrier waves bearing the information and instructions.

The computer system 600 can send messages and receive data, including program code, through the network(s), the network link 619, and the communication interface 617. In the Internet example, a server (not shown) might transmit requested code belonging to an application program for implementing an exemplary embodiment through the network 625, the local network 621 and the communication interface 617. The processor 603 may execute the transmitted code while being received and/or store the code in the storage device 609, or other non-volatile storage for later execution. In this manner, the computer system 600 may obtain application code in the form of a carrier wave.

The term "computer-readable medium" as used herein refers to any medium that participates in providing instructions to the processor 603 for execution. Such a medium may take many forms, including but not limited to non-volatile media, volatile media, and transmission media. Non-volatile media include, for example, optical or magnetic disks, such as the storage device 609. Volatile media include dynamic memory, such as main memory 605. Transmission media include coaxial cables, copper wire and fiber optics, including the wires that comprise the bus 601. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the various exemplary embodiments may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that flow. The specification and the drawings are accordingly to be regarded in an illustrative rather than restrictive sense.

What is claimed is:

1. A method comprising:
   receiving dialed digits associated with a call originated from a wireless network;
   determining whether the dialed digits include either a steering digit or a pre-determined prefix;

verifying authorization codes and range privileges of the call;

routing the call according to an abbreviated dialing plan if the steering digit or the pre-determined prefix is present;

allowing a user who initiated the call to have access to a call portal for managing on-network voice services; and permitting the user to specify dynamic routing changes, static time-of-day routing or selective routing.

2. The method according to claim 1, wherein the abbreviated dialing plan is utilized for an enterprise.

3. The method according to claim 1, further comprising:
sending a query to a network control point for routing instructions.

4. The method according to claim 3, wherein the network control point is configured to convert the dialed digits into an on-network number.

5. The method according to claim 3, wherein the network control point is configured to determine a termination path for terminating the call.

6. The method according to claim 1, wherein the steering digit includes a "*" button.

7. A nontransitory computer-readable storage medium configured to store instructions to execute the method of claim 1.

8. An apparatus comprising:
a processor configured to receive dialed digits associated with a call originated from a wireless network, and to determine whether the dialed digits include either a steering digit or a pre-determined prefix, wherein the processor is configured to verify authorization codes and range privileges of the call, wherein the processor is further configured to route the call according to an abbreviated dialing plan if the steering digit or the pre-determined prefix is present; and wherein the processor is also configured to allow a user who initiated the call to have access to a call portal for managing on-network voice services, said portal permitting the user to specify dynamic routing changes, static time-of-day routing or selective routing.

9. The apparatus according to claim 8, wherein the abbreviated dialing plan is utilized for an enterprise.

10. The apparatus according to claim 8, wherein the processor is configured to generate a query for transmission to a network control point for routing instructions.

11. The apparatus according to claim 10, wherein the network control point is configured to convert the dialed digits into an on-network number.

12. The apparatus according to claim 10, wherein the network control point is configured to determine a termination path for terminating the call.

13. The apparatus according to claim 8, wherein the steering digit includes a "*" button.

14. A method comprising:
receiving a query from a network switch configured to provide on-network voice services, wherein the query requests routing instructions for a call originating from a wireless network;

converting, according to an abbreviated dialing plan, a dialed number associated with the call into an on-network number, wherein the call is terminated based on the on-network number and further wherein a user who initiated the call has access to a call portal for managing the on-network voice services;

verifying range privileges of calls placed by the user; and permitting the user via the call portal to specify dynamic routing changes, static time-of-day routing or selective routing.

15. The method according to claim 14, wherein the abbreviated dialing plan is utilized for an enterprise.

16. The method according to claim 14, wherein the dialed number includes a steering digit to invoke the abbreviated dialing plan.

17. The method according to claim 14, wherein the dialed number includes a pre-determined prefix to invoke the abbreviated dialing plan.

18. The method according to claim 14, wherein the portal resides on a wireless device of the user.

19. A nontransitory computer-readable storage medium configured to store instructions to execute the method of claim 14.

20. A system comprising:
a network control point configured to receive a query from a network switch configured to provide on-network voice services, wherein the query requests routing instructions for a call originating from a wireless network; the network control point being further configured to convert, according to an abbreviated dialing plan, a dialed number associated with the call into an on-network number and wherein the network control point is further configured to verify range privileges of the call, wherein the call is terminated based on the originating number and the on-network number, and further wherein a user who initiated the call has access to a call portal for managing the on-network voice services; said portal permitting the user to specify dynamic routing changes, static time-of-day routing or selective routing.

21. The system according to claim 20, wherein the abbreviated dialing plan is utilized for an enterprise.

22. The system according to claim 20, wherein the dialed number includes a steering digit to invoke the abbreviated dialing plan.

23. The system according to claim 20, wherein the dialed number includes a pre-determined prefix to invoke the abbreviated dialing plan.

24. The system according to claim 20, wherein the portal resides on a wireless device of the user.

* * * * *